(12) United States Patent
Schleck et al.

(10) Patent No.: US 7,338,040 B2
(45) Date of Patent: Mar. 4, 2008

(54) HIGH RETENTION STRENGTH JOUNCE BUMPER ASSEMBLY

(75) Inventors: Laurie J. Schleck, Candia, NH (US); Mickey L. Love, Londonderry, NH (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 171 days.

(21) Appl. No.: 11/151,776

(22) Filed: Jun. 14, 2005

(65) Prior Publication Data

US 2006/0279031 A1  Dec. 14, 2006

(51) Int. Cl.
*F16F 7/00* (2006.01)
*B60G 15/00* (2006.01)

(52) U.S. Cl. .............................. 267/220; 280/124.147; 280/124.179; 280/124.177

(58) Field of Classification Search ......... 280/124.147, 280/124.179, 124.177; 267/220
See application file for complete search history.

(56) References Cited

U.S. PATENT DOCUMENTS

| | | | |
|---|---|---|---|
| 3,266,139 A | 8/1966 | Adams | |
| 3,338,542 A | 8/1967 | Meinhard | |
| 3,622,194 A | 11/1971 | Bryk | |
| 3,809,427 A | 5/1974 | Bennet | |
| 3,927,730 A | 12/1975 | Winslow | |
| 4,256,292 A | 3/1981 | Sullivan, Jr. et al. | |
| 4,462,608 A * | 7/1984 | Lederman | 280/124.155 |
| 4,720,075 A | 1/1988 | Peterson et al. | |
| 4,756,516 A * | 7/1988 | Tondato | 267/153 |
| 4,804,169 A | 2/1989 | Hassan | |
| 4,805,886 A | 2/1989 | Hassan | |
| 4,921,203 A | 5/1990 | Peterson et al. | |
| 5,052,665 A * | 10/1991 | Sakuragi | 267/220 |
| 5,178,433 A | 1/1993 | Wagner | |
| 5,232,209 A | 8/1993 | de Fontenay | |
| 5,257,730 A * | 11/1993 | Nakaura | 267/220 |
| 5,308,048 A | 5/1994 | Weaver et al. | |
| 5,467,970 A * | 11/1995 | Ratu et al. | 267/220 |
| 5,487,535 A | 1/1996 | Carter et al. | |
| 5,725,203 A | 3/1998 | Lloyd | |
| 5,788,262 A * | 8/1998 | Dazy et al. | 280/124.155 |
| 5,799,930 A | 9/1998 | Willett | |

(Continued)

FOREIGN PATENT DOCUMENTS

DE   10301569 A1   7/2004

(Continued)

OTHER PUBLICATIONS

Saab NG900, "Suspension and Steering," 2 pages (Sep. 22, 2004); http://www.saabcentral.com/~munki/technical/suspension_steering/tech_specs.htm.

*Primary Examiner*—Robert A. Siconolfi
*Assistant Examiner*—Kochi Rashid
(74) *Attorney, Agent, or Firm*—Harness, Dickey & Pierce, P.L.C.

(57) ABSTRACT

A jounce bumper assembly is provided including a cup-shaped member adapted to be mounted to a vehicle. A spacer formed of an appropriate engineered material is mounted within the cup-shaped member and a jounce bumper is mounted to the spacer. The cup-shaped member includes retaining tabs which engage a shoulder of the jounce bumper for retaining the jounce bumper in the cup-shaped member.

4 Claims, 4 Drawing Sheets

U.S. PATENT DOCUMENTS

| | | |
|---|---|---|
| 5,941,511 A | 8/1999 | Dawda et al. |
| 6,113,084 A | 9/2000 | Norkus et al. |
| 6,158,726 A | 12/2000 | Coleman et al. |
| 6,254,072 B1 * | 7/2001 | Bono et al. ................. 267/220 |
| 6,296,237 B1 * | 10/2001 | Nagai ......................... 267/220 |
| 6,361,027 B1 * | 3/2002 | Lun ......................... 267/64.21 |
| 6,364,296 B1 | 4/2002 | Cummings et al. |
| 6,485,008 B1 | 11/2002 | Griffin |
| 6,655,669 B1 | 12/2003 | Jung |
| 6,676,145 B2 | 1/2004 | Carlstedt et al. |
| 6,733,023 B2 * | 5/2004 | Remmert et al. ..... 280/124.179 |
| 6,749,047 B2 * | 6/2004 | Koyano et al. ........ 188/321.11 |
| 6,776,402 B2 * | 8/2004 | Miyamoto et al. .......... 267/220 |
| 7,077,248 B2 * | 7/2006 | Handke et al. ........ 188/321.11 |
| 2002/0109328 A1 * | 8/2002 | Remmert et al. ..... 280/124.147 |
| 2002/0145242 A1 * | 10/2002 | Miyamoto et al. .......... 267/220 |
| 2003/0057041 A1 * | 3/2003 | Koyano et al. ........ 188/322.12 |
| 2004/0012136 A1 * | 1/2004 | Mennesson ................. 267/220 |
| 2006/0043659 A1 * | 3/2006 | Gofron et al. .............. 267/220 |
| 2006/0082037 A1 * | 4/2006 | Al-Dahhan ................. 267/179 |
| 2006/0082038 A1 * | 4/2006 | Al-Dahhan et al. ......... 267/220 |
| 2006/0208406 A2 * | 9/2006 | Al-Dahhan et al. ......... 267/220 |

FOREIGN PATENT DOCUMENTS

| | | |
|---|---|---|
| EP | 288341 A1 * | 10/1988 |
| JP | 62275811 A * | 11/1987 |

* cited by examiner

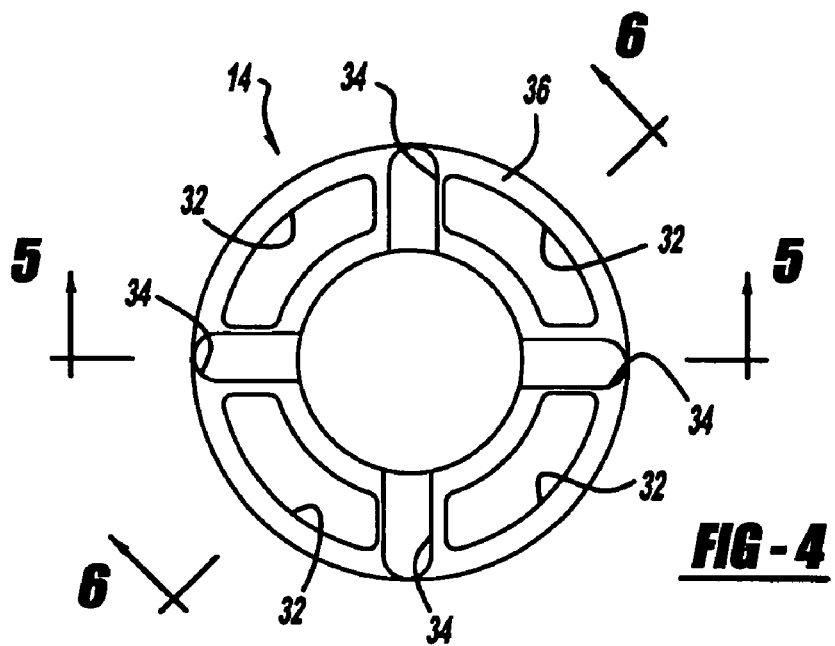
*FIG - 4*
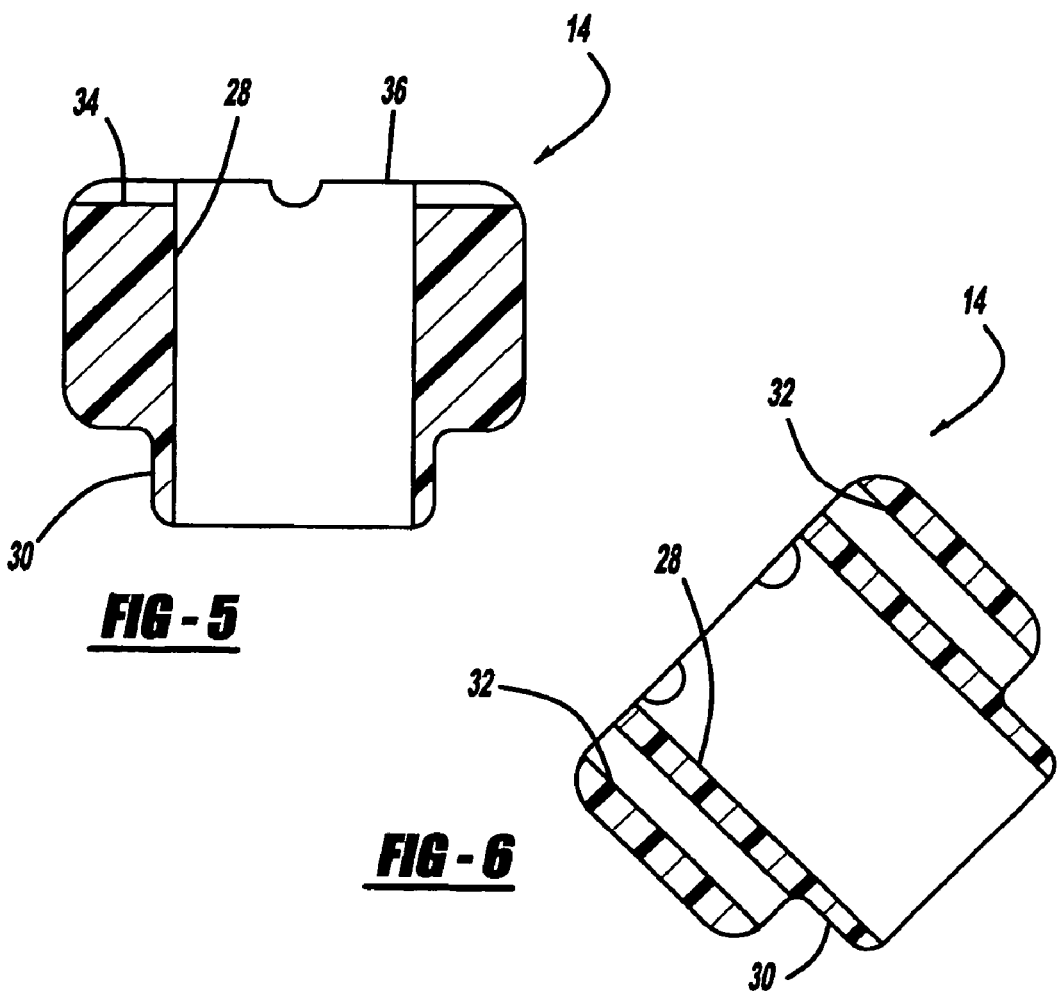
*FIG - 5*
*FIG - 6*

HIGH RETENTION STRENGTH JOUNCE BUMPER ASSEMBLY

FIELD OF THE INVENTION

The present invention relates to suspension systems for motor vehicles, and more particularly to a high retention strength jounce bumper assembly for use in a suspension system of a motor vehicle.

BACKGROUND OF THE INVENTION

Jounce bumpers are often mounted on a strut assembly, as shown in U.S. Pat. No. 5,487,535, where a jounce bumper surrounds a piston rod of a strut suspension. The jounce bumper prevents the cylinder of the strut assembly from heavily impacting the strut mounting assembly. Jounce bumpers are also commonly mounted in other locations, as shown in U.S. Pat. No. 5,725,203, where the jounce bumper is free standing to prevent a control arm of the suspension system from impacting with the vehicle frame.

Jounce bumpers can be mounted in a free state or with a rigid cup. Commonly assigned U.S. Pat. No. 6,158,726 discloses a jounce bumper with the use of a rigid cup that is designed to be attached to the vehicle frame. The rigid cup acts to attach the jounce bumper to the vehicle (or alternatively the strut) and limits the jounce bumper distortion, thereby increasing its spring rate. The force necessary to compress the jounce bumper increases as the jounce bumper is compressed and the jounce bumper absorbs energy as it is compressing. As the jounce bumper is compressed, the resistance to compression increases to the point where the jounce bumper acts as a solid, and transfers the remaining energy from the impact to the vehicle. The use of a rigid cup or another constraint limits the bulging of the bumper, thereby reducing the amount of travel needed to reach the point where the bumper becomes a solid. In general, when more energy must be removed, a larger bumper is used.

Microcellular urethane (MCU) bumpers are used in vehicle suspensions to absorb energy during jounce and to act as a supplemental spring as is shown in U.S. Pat. No. 5,467,970. One consideration with regard to the use of MCU bumpers is the ability to retain the MCU bumper which is subjected to both vertical and side-loaded pull-out forces.

SUMMARY OF THE INVENTION

Accordingly, the jounce bumper assembly of the present invention includes a generally cup-shaped member adapted to be fixed to a portion of the motor vehicle. The generally cup-shaped member includes a sidewall portion in which is received a spacer formed of a first material and mounted entirely within the sidewall portion of the generally cup-shaped member. The spacer has an outer diameter approximately equal to an inner diameter of a portion of the sidewall of the generally cup-shaped member. A bumper formed of a second material, different than the first material is attached to a face portion of the spacer within the cup. The bumper extends out of the cup. The system of the present invention can be utilized on a strut assembly with a piston rod of a strut suspension being received through central apertures provided in the cup, spacer and bumper. Alternatively, the jounce bumper assembly of the present invention can also be utilized as a freestanding bumper to prevent a control arm of the suspension from impacting the vehicle frame.

According to yet another aspect of the present invention, the cup-shaped member includes at least one tab extending into a recess in the bumper for retaining the bumper within the cup-shaped member. The bumper is attached to the spacer with an adhesive, or alternatively, is molded to the spacer while providing the bumper with high retention strength.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a top-plan view of the spacer of a jounce bumper assembly according to the principles of the present invention;

FIG. 5 is a cross-sectional view taken along line 5-5 of FIG. 4;

FIG. 6 is a cross-sectional view taken along line 6-6 of FIG. 4;

DETAILED DESCRIPTION OF THE PREFERRED EMBODIMENTS

The following description of the preferred embodiment(s) is merely exemplary in nature and is in no way intended to limit the invention, its application, or uses.

With reference to FIGS. 1-6, a jounce bumper assembly 10 according to the principles of the present invention is shown. The jounce bumper assembly 10 includes a generally cup-shaped member 12 which receives a spacer 14 therein. The spacer 14 can be made from an appropriate engineered material including plastics or metals. An elastomeric bumper 16 is attached to the spacer 14 and extends outward from the generally cup-shaped member 12. The elastomeric bumper 16 can be made from any elastomeric material including microcellular urethane.

Figure 3:
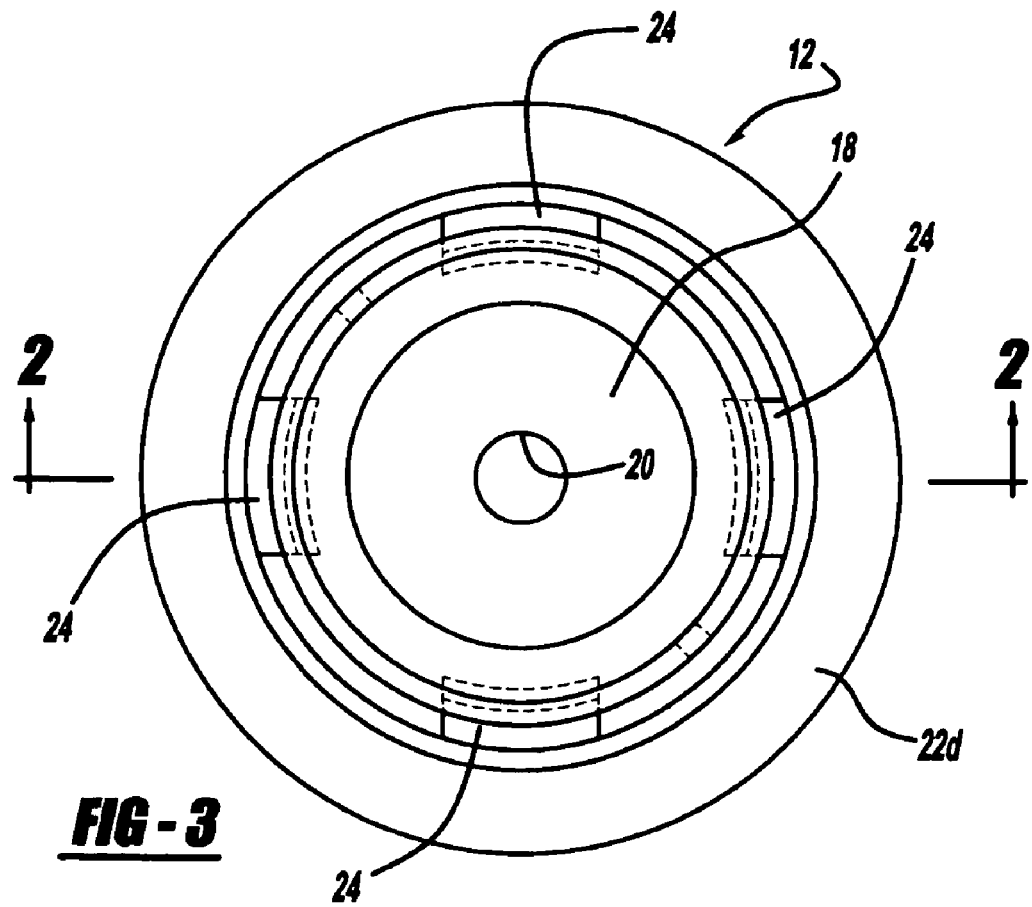
FIG. 3 is a plan view of the cup support member shown in FIG. 2.
Figure 2:
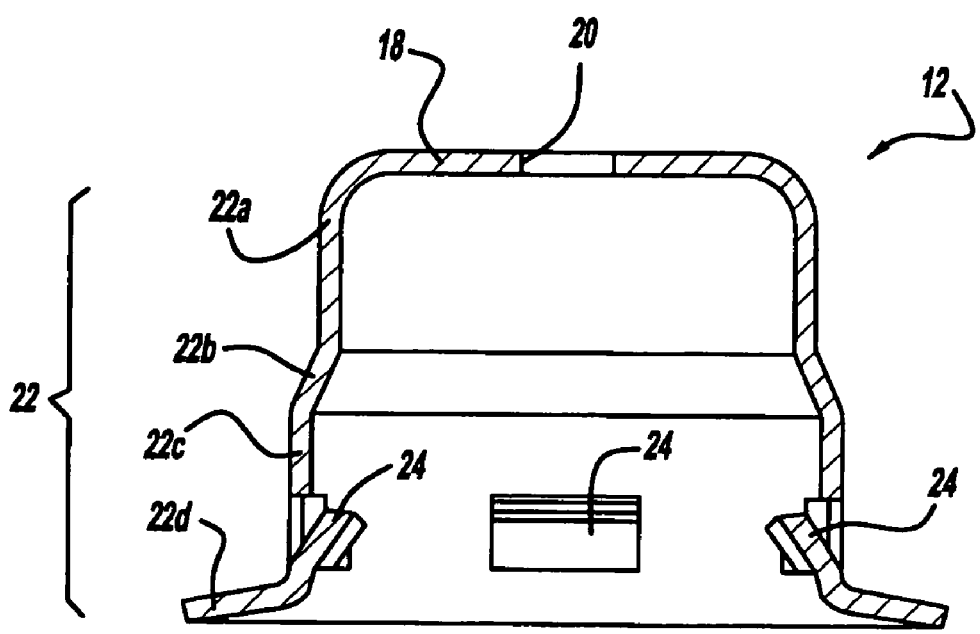
FIG. 2 is a cross-sectional view of a cup support member of a jounce bumper assembly according to the principles of the present invention.

The cup-shaped member 12 is adapted to be mounted to a vehicle, and more specifically, can be mounted on a strut assembly or in a free-standing position. The generally cup-shaped member 12 includes a base portion 18 having an aperture 20 centrally located therein. The base portion 18 and aperture 20 are utilized for mounting the cup-shaped member to the vehicle, either by receiving the piston rod of a strut suspension or by receiving a mounting bolt which mounts the cup to the vehicle frame, as is known in the art. The generally cup-shaped member 12 includes a cylindrical sidewall portion 22 including a first smaller diameter portion 22a extending from the base portion 18, a angular disposed transition portion 22b, a relatively larger diameter sidewall portion 22c extending from the transition portion 22b and a radial extending flange portion 22d extending from the larger diameter portion 22c. It should be understood that although the generally cup-shaped member 12 is shown with a cylindrical sidewall portion 22, other geometries such as square, rectangle, octagon, and oval can also be used. The larger diameter sidewall portion 22c is provided with a plurality of retaining tabs 24 which extend radially inward as cut out portions as best illustrated in FIGS. 2 and 3. As illustrated in FIGS. 2 and 3, retaining tabs 24 are spaced at 90 degree intervals such that 4 retaining tabs 24 are shown. However, it should be understood that a greater or smaller number of retaining tabs could also be utilized.

With reference to FIGS. 4-6, the spacer 14 is preferably formed as an annular ring molded from an appropriate engineered material including ABS/PA blend plastic. The spacer 14 has a central opening 28 which can receive the piston rod of a strut suspension in cases where the jounce bumper assembly 10 is mounted on a strut assembly or can receive a mounting bolt in the cases where the jounce bumper assembly is free standing. The spacer body also includes an axially extending flange portion 30 concentric with the aperture 28. For weight reduction, the spacer can be provided with recessed axially extending slots 32 which reduce the amount of material utilized for the spacer in addition to reducing the weight thereof. Vent ribs 34 are provided in the upper face 36 and extend radially outwardly from the center aperture 28. The vent ribs 34 allow air trapped in the center during compression of the bumper to be directed to the outer edge of the assembly where it is thereby vented through the tabs in the cup. The free passage of air eliminates noise (i.e., hissing, puffing, and squeaking).

Figure 1:
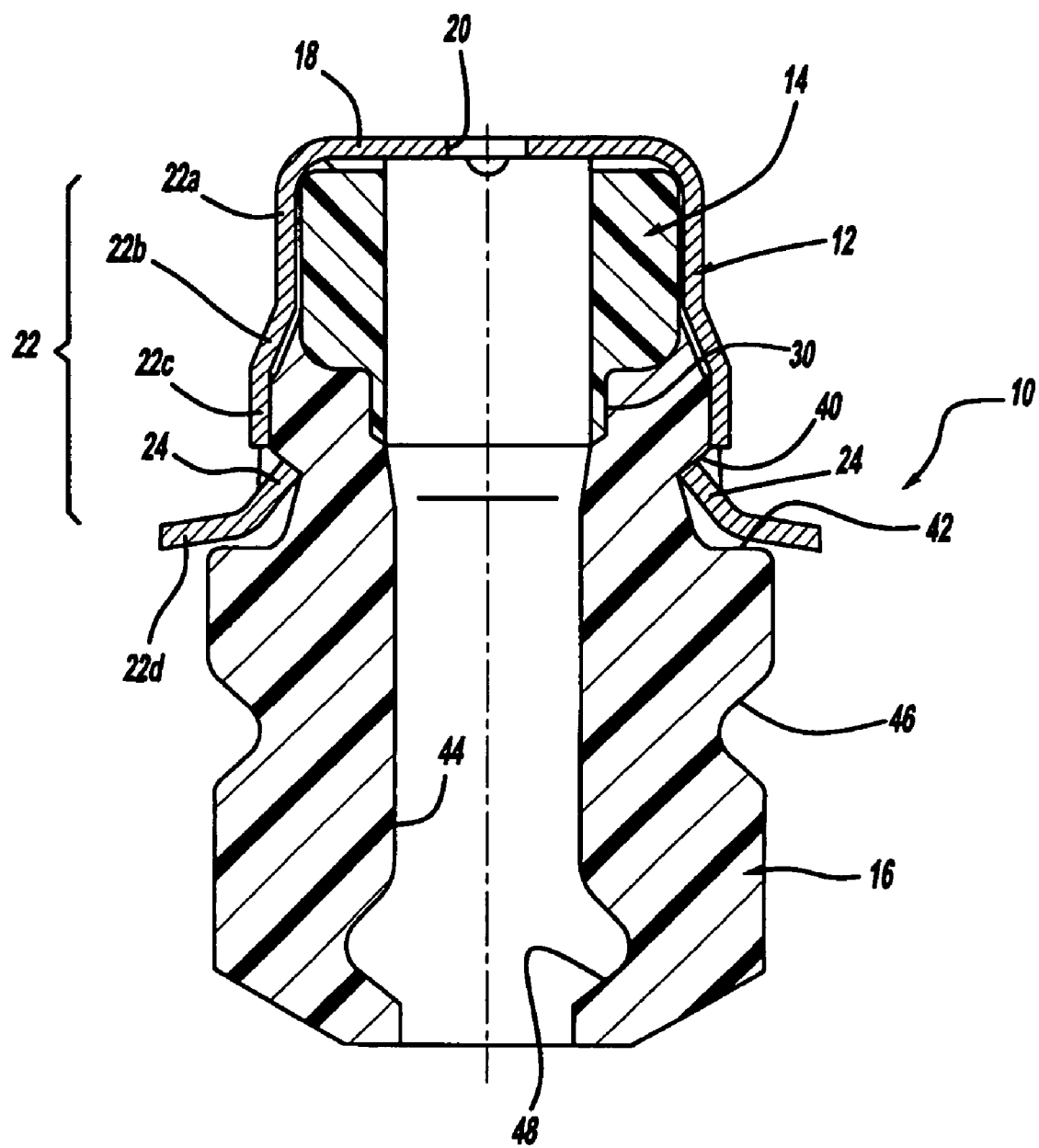
FIG. 1 is a cross-sectional view of a jounce bumper assembly constructed according to the principles of the present invention.

With reference to FIG. 1, the bumper 16 is formed of an elastomeric material and is molded to the spacer 14 such that the bumper 16 surrounds the axial extending flange portion 30 of the spacer and extends partially along the sidewalls of the main body of the spacer 14 in the vicinity of the transition portion 22b of the cup 12. The spacer 14 has an outer diameter approximately equal to an inner diameter of the small diameter portion 22a of the cup 12. The bumper 16 includes a shoulder portion 40 which is engaged by the retaining tabs 24 of the cup 12. The recessed shoulder portion 40 is axially in the vicinity of the axially extending flange portion 30 of the spacer 14. A second shoulder portion 42 of the bumper 16 is disposed against the radially extending flange portion 22d of the sidewall, 22 of the cup member 12.

According to a preferred embodiment, the jounce bumper assembly 10 has a total length of approximately 120 millimeters with the cup member having a length of 56 millimeters and the spacer having a total length of 39 millimeters with the main body portion of the spacer (exclusive of the axially extending flange portion 30 being approximately 29 millimeters. The bumper portion 16 extends beyond the main body portion of the spacer 14 a length of approximately 90 millimeters with the portion of the bumper 16 extending from the cup 12 being approximately 64 millimeters. Thus, the cup member 12 provides approximately 26 millimeters of overlap with the bumper 16.

The bumper 16 has a central aperture 44 which is capable of receiving a piston rod of a strut suspension when the jounce bumper is used on a strut assembly, or can receive a bolt, nut, snapfit fastener, or other fastener device therein where the jounce bumper assembly 10 is free standing. The jounce bumper 16 can also be provided with recessed portions 46, 48 extending in the radially inward direction from the external surface or radially outward from the internal surface in order to specifically tune the impact absorption capabilities of the jounce bumper assembly 10. In the embodiment shown, one recessed portion 46 is provided in the exterior surface and one recessed portion 48 is provided in the interior surface, although it should be understood that additional recesses can be utilized, or removed, as well as the depth of the recessed portions can be increased in order to specifically tune the impact absorption capabilities.

Figure 7:
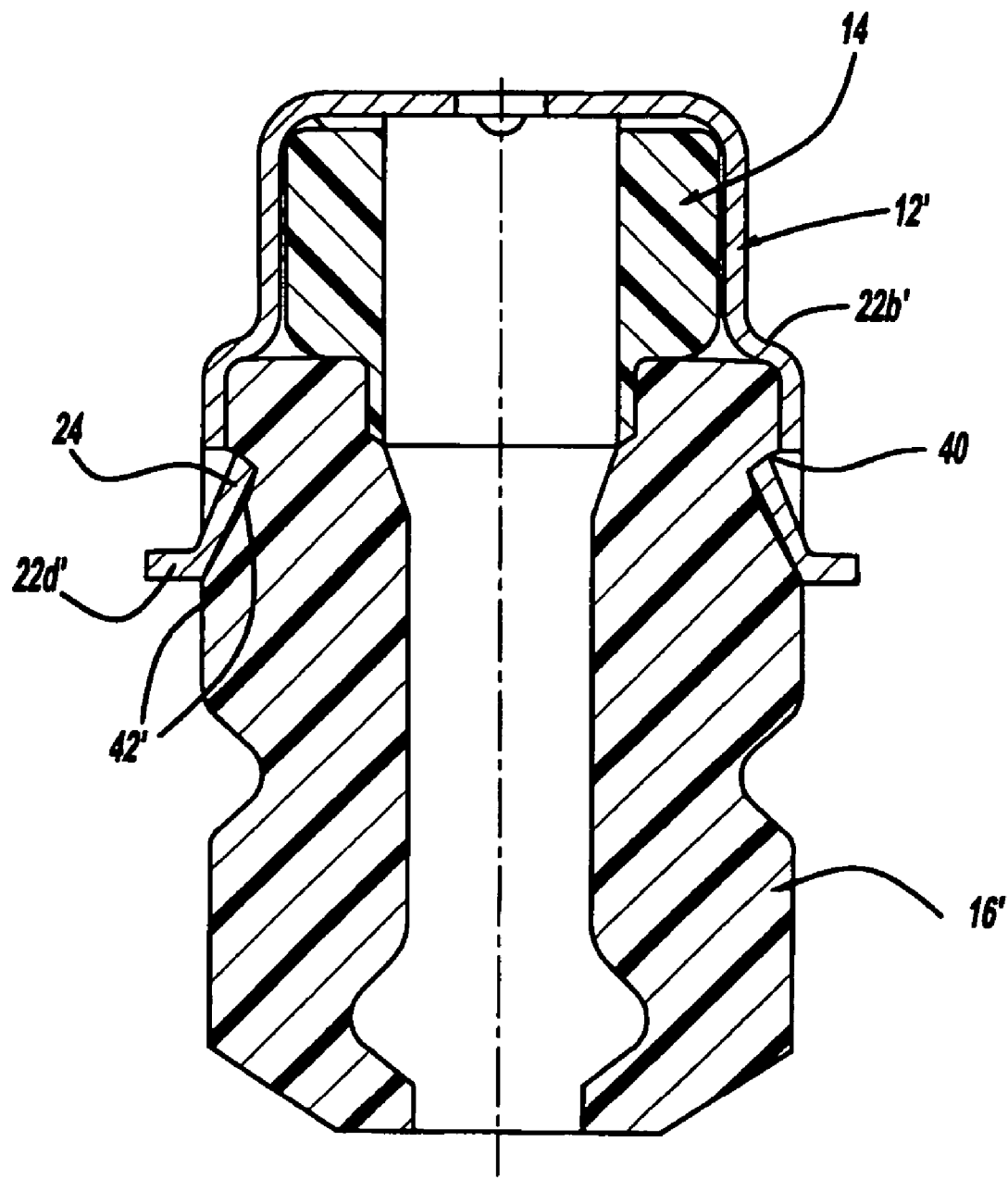
FIG. 7 is a cross-sectional view of an alternative jounce bumper assembly constructed according to the principles of the present invention.

As illustrated in FIG. 7, an alternative arrangement of the jounce bumper 10' is shown in which the bumper 16' is adhesively bonded to the spacer 14 as an alternative to molding the bumper 16 to the spacer 14 as shown in the embodiment of FIG. 1. In addition, as illustrated in FIG. 7, the amount of overlap of the shoulder 42' over the radially extending flange portion 22d' can be varied in order to appropriately tune the jounce bumper assembly 10' according to desired applications. Furthermore, the angle of the transition portion 22b of the sidewall 22 of cup member 12 can be provided with different angles in order to further tune and support the bumper 16.

The jounce bumper assembly 10 of the present invention provides extraordinary retention of the jounce bumper 16 within the cup 12 without having to use a large undercut and complex stamping. The bonding achieved via molding or adhesive does not allow the jounce bumper 16 to decrease cross-sectional area when subjected to pull out forces in both vertical and side loaded directions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A jounce bumper assembly comprising:
a generally cup-shaped member adapted to be fixed to a portion of a motor vehicle, said generally cup-shaped member having a sidewall;
a plastic spacer mounted entirely within said sidewall portion of said generally cup-shaped member, said spacer having an outer diameter approximately equal to an inner diameter of a portion of said sidewall; and
a microcellular urethane bumper bonded to a face portion of the spacer within the cup, the bumper extending out from the cup, wherein said plastic spacer includes a plurality of axially extending slots extending therethrough.

2. A jounce bumper assembly comprising:
a generally cup-shaped member adapted to be fixed to a portion of a motor vehicle, said generally cup-shaped member having a sidewall;
a plastic spacer mounted entirely within said sidewall portion of said generally cup-shaped member, said spacer having an outer diameter approximately equal to an inner diameter of a portion of said sidewall; and
a microcellular urethane bumper bonded to a face portion of the spacer within the cup, the bumper extending out from the cup, wherein said plastic spacer includes at least one radially extending vent rib in an upper face thereof.

3. A jounce bumper assembly comprising:
a generally cup-shaped member adapted to be fixed to a portion of a motor vehicle, said generally cup-shaped member having a sidewall;
a plastic spacer mounted entirely within said sidewall portion of said generally cup-shaped member, said plastic spacer having an outer diameter approximately equal to an inner diameter of a portion of said sidewall; and a bumper formed of microcellular urethane and molded to said plastic spacer, the bumper extending out from the cup, said bumper includes an undercut portion, and said generally cup-shaped member includes at least one tab that extends into said undercut portion to hold said bumper within said generally cup-shaped member, wherein said plastic spacer includes a plurality of axially extending slots extending therethrough.

4. A jounce bumper assembly comprising:

a generally cup-shaped member adapted to be fixed to a portion of a motor vehicle, said generally cup-shaped member having a sidewall;

a plastic spacer mounted entirely within said sidewall portion of said generally cup-shaped member, said plastic spacer having an outer diameter approximately equal to an inner diameter of a portion of said sidewall; and a bumper formed of microcellular urethane and molded to said plastic spacer, the bumper extending out from the cup, said bumper includes an undercut portion, and said generally cup-shaped member includes at least one tab that extends into said undercut portion to hold said bumper within said generally cup-shaped member, wherein said plastic spacer includes at least one radially extending vent rib in an upper face thereof.

* * * * *